United States Patent
Li et al.

(10) Patent No.: US 11,873,423 B2
(45) Date of Patent: Jan. 16, 2024

(54) MOISTURE CURABLE ADHESIVE COMPOSITIONS

(71) Applicant: Kaneka Americas Holding, Inc., Pasadena, TX (US)

(72) Inventors: Wenwen Li, Pasadena, TX (US); Ken Sutherland, Pasadena, TX (US)

(73) Assignee: Kaneka Americas Holding, Inc., Pasadena, TX (US)

( * ) Notice: Subject to any disclaimer, the term of this patent is extended or adjusted under 35 U.S.C. 154(b) by 38 days.

(21) Appl. No.: 17/434,612

(22) PCT Filed: Feb. 28, 2020

(86) PCT No.: PCT/US2020/020416
§ 371 (c)(1),
(2) Date: Aug. 27, 2021

(87) PCT Pub. No.: WO2020/176861
PCT Pub. Date: Sep. 3, 2020

(65) Prior Publication Data
US 2022/0145146 A1     May 12, 2022

Related U.S. Application Data

(60) Provisional application No. 62/811,640, filed on Feb. 28, 2019.

(51) Int. Cl.
| | |
|---|---|
| *C08G 65/336* | (2006.01) |
| *C09J 171/02* | (2006.01) |
| *C09J 5/02* | (2006.01) |
| *C09J 7/24* | (2018.01) |
| *C09J 7/30* | (2018.01) |

(52) U.S. Cl.
CPC .......... *C09J 171/02* (2013.01); *C08G 65/336* (2013.01); *C09J 5/02* (2013.01); *C09J 7/243* (2018.01); *C09J 7/245* (2018.01); *C09J 7/30* (2018.01); *C09J 2423/006* (2013.01); *C09J 2423/166* (2013.01); *C09J 2427/006* (2013.01); *C09J 2471/00* (2013.01)

(58) Field of Classification Search
None
See application file for complete search history.

(56) References Cited

U.S. PATENT DOCUMENTS

| | | |
|---|---|---|
| 3,632,557 A | 1/1972 | Brode et al. |
| 4,345,053 A | 8/1982 | Rizk et al. |
| 4,366,307 A | 12/1982 | Singh et al. |
| 4,485,246 A | 11/1984 | Lyons |
| 4,631,207 A | 12/1986 | Price |
| 4,960,844 A | 10/1990 | Singh |
| 7,019,074 B2 | 3/2006 | Nakamura et al. |
| 7,211,616 B2 * | 5/2007 | Kaszubski ........... C08G 65/336 524/588 |
| 7,759,425 B2 * | 7/2010 | Kawakami ......... C08G 65/2609 525/100 |
| 7,767,308 B2 | 8/2010 | Georgeau et al. |
| 8,586,688 B2 | 11/2013 | Okamoto et al. |
| 8,883,936 B2 | 11/2014 | Odaka et al. |
| 10,150,895 B2 | 12/2018 | Itano et al. |
| 2012/0123048 A1 | 5/2012 | Ziche |
| 2018/0002491 A1 | 1/2018 | Peeters et al. |
| 2018/0282518 A1 | 10/2018 | Ogawa et al. |

FOREIGN PATENT DOCUMENTS

| | | |
|---|---|---|
| EP | 3549994 A1 | 10/2019 |
| JP | S45-36319 | 11/1970 |
| JP | S46-12154 | 3/1971 |
| JP | S50-156599 A | 12/1975 |
| JP | S54-6096 A | 1/1979 |
| JP | S55-13767 A | 1/1980 |
| JP | S57-164123 A | 10/1982 |
| JP | S61-197631 A | 9/1986 |
| JP | S61-215622 A | 9/1986 |
| JP | S61-215623 A | 9/1986 |
| JP | S61-218632 A | 9/1986 |
| JP | H03-2450 B2 | 1/1991 |
| JP | H03-47825 A | 2/1991 |
| JP | 44-85246 B2 | 6/2010 |
| WO | 2020176861 A1 | 9/2020 |

OTHER PUBLICATIONS

International Search Report including Written Opinion for PCT/US2020/020416 dated Feb. 28, 2020; 16 pages.
Supplemental European Search Report issued in Appln. No. 20763838.8 dated Nov. 29, 2022 (2 pages).
International Search Report issued in Appln. No. PCT/US2021/048862 dated Dec. 13, 2021 (2 pages).

* cited by examiner

*Primary Examiner* — Scott R. Walshon
*Assistant Examiner* — Thomas A Mangohig
(74) *Attorney, Agent, or Firm* — Lerner David LLP

(57) ABSTRACT

A moisture curable composition, and a method of application and a substrate including the same are disclosed herein. In some embodiments, a curable composition includes a component (A) comprising an organic polymer containing reactive silicon groups represented by the general formula (1), a component (B) comprising an organic polymer having a viscosity lower than 10,000 cP at 23° C. containing reactive silicon groups represented by the general formula (2), and a component (C) comprising a polyolefin polymer. The moisture curable composition has universal adhesiveness to an adhesion-resistant substrate, such as PVC, EPDM, and TPO. The substrates can be smooth-back or fleece-back substrates.

20 Claims, No Drawings

MOISTURE CURABLE ADHESIVE COMPOSITIONS

CROSS-REFERENCE TO RELATED APPLICATIONS

The present application is a national phase entry under 35 U.S.C. § 371 of International Application No. PCT/US2020/020416, filed Feb. 28, 2020, which claims priority from U.S. Provisional Patent Application No. 62/811,640, filed Feb. 28, 2019, the disclosures of which are incorporated by reference herein.

FIELD OF THE INVENTION

The present invention relates to a moisture curable adhesive composition that includes an organic polymer containing reactive silicon groups. The invention relates in particular to a moisture curable adhesive composition having universal adhesiveness to adhesion-resistant substrates, such as polyvinyl chloride (hereinafter defined as "PVC"), ethylene propylene diene rubber (hereinafter defined as "EPDM"), thermoplastic polyolefin (hereinafter referred to as "TPO"), and the like, and the use thereof.

BACKGROUND OF THE INVENTION

In recent years, investigations have been made for improving the adhesiveness to an adhesion-resistant substrate, such as EPDM by the addition of a thermoplastic elastomer to a reactive silicon group-containing organic polymer (for example, Japanese Patent No. 4485246B2 to Kanegafuchi Chemical Industry Co., Ltd. and Kaneka Texas Corp.).

U.S. Pat. No. 7,759,425 to Kaneka Corp. describes a moisture curable formulation to improve adhesion to TPO through incorporation of a tackifier and chlorinated polyolefin to reactive silicon group-containing organic polymers.

U.S. Pat. No. 7,767,308 to Chemlink, Inc. describes the use of reactive silicon group-containing organic polymers, phenolic tackifiers, and silane adhesion promoters for bonding with rubber material.

Unfortunately, these formulations cannot lead to universal good adhesion across different substrates, including EPDM, PVC, and TPO. Achieving adhesion to the smooth-back version of these substrates is particularly difficult in comparison to their fleece-back versions, which contain an additional surface treatment to improve adhesion. Solvent based bonding adhesives are still widely used products in the market with excellent adhesion performance on these difficult-to-adhere-to plastic substrates. However, a solvent-based system requires that the solvents be evaporated before the two substrates are mated to each other. This impacts air quality and extends construction timelines. Thus, safety and health concerns for workers arise during manufacturing and, in cases of occupied structures, normal building operations must be suspended due to noxious odors. The solvent-based system may also lead to a significant environmental burden or fire hazard. There is a need to develop an adhesive formulation, which is either solvent-free or contains low amount of solvents, but still can provide universal good adhesion properties on substrates such as, EPDM, PVC, TPO, and the like in both smooth-back and fleece-back variants of the substrates.

BRIEF SUMMARY OF THE INVENTION

A moisture curable composition is disclosed herein. In some embodiments, it is a moisture curable composition that includes:

a component (A) an organic polymer having a viscosity of greater than 20,000 cP at 23° C. and containing reactive silicon groups represented by the following general formula (1):

$$-\text{Si}(R^1_{3-a})X_a \quad (1)$$

wherein $R^1$ represents an alkyl group having 1 to 20 carbon atoms, an aryl group having 6 to 20 carbon atoms, or an aralkyl group having 7 to 20 carbon atoms, X represents a hydrolyzable group, wherein each X may be the same or different when two or more X are present, and a represents 1, 2 or 3, provided that when a is 1, each $R^1$ may be the same or different and provided that when a is 2 or 3, each X may be the same or different;

a component (B) an organic polymer having a viscosity lower than 10,000 cP at 23° C. containing reactive silicon groups represented by the following general formula (2):

$$-\text{Si}(R^2_{3-b})X_b \quad (2)$$

wherein $R^2$ represents an alkyl group having 1 to 20 carbon atoms, an aryl group having 6 to 20 carbon atoms, or an aralkyl group having 7 to 20 carbon atoms, X represents a hydrolyzable group, wherein each X may be the same or different when two or more X are present, and b represents 1, 2 or 3, provided that when b is 1, each $R^2$ may be the same or different and provided that when b is 2 or 3, each X may be the same or different; and a component (C) comprising a polyolefin polymer.

In some embodiments, X in general formulas (1) and (2) is represented by —OR, where R is an alkyl having 1 to 2 carbon atoms.

In some embodiments, the organic polymer of components (A and/or B) may have a main chain of polyoxypropylene.

In some embodiments, the organic polymer of components (A and/or B) may include a group represented by the following general formula (3):

$$-\text{NR}^3\text{C}(=O)- \quad (3)$$

wherein $R^3$ represents a hydrogen atom, an alkyl group having 1 to 20 carbon atoms, an aryl group having 6 to 20 carbon atoms, or an aralkyl group having 7 to 20 carbon atoms.

In some embodiments, the polyolefin polymer of component (C) may be a chlorinated polyolefin polymer.

In some embodiments, the polyolefin polymer of component (C) may be a polymer modified with acrylic acid moieties, maleic acid, and/or maleic anhydride.

In some embodiments, component (C) may include a solvent or a plasticizer.

In some embodiments, a moisture curable composition that includes:

a component (A) an organic polymer containing reactive silicon groups represented by the following general formula (1):

$$-\text{Si}(R^1_{3-a})X_a \quad (1)$$

wherein $R^1$ represents an alkyl group having 1 to 20 carbon atoms, an aryl group having 6 to 20 carbon atoms, or an aralkyl group having 7 to 20 carbon atoms, X represents a hydrolyzable group, wherein each X may be the same or different when two or more X are present, and a represents 1, 2 or 3, provided that when a is 1, each $R^1$ may be the same or different and provided that when a is 2 or 3, each X may be the same or different;

a component (B) an organic polymer having a viscosity lower than 5,000 cP at 23° C. containing reactive silicon groups represented by the following general formula (2):

$$-Si(R^2{}_{3-b})X_b \qquad (2)$$

wherein $R^2$ represents an alkyl group having 1 to 20 carbon atoms, an aryl group having 6 to 20 carbon atoms, or an aralkyl group having 7 to 20 carbon atoms, X represents a hydrolyzable group, wherein each X may be the same or different when two or more X are present, and b represents 1, 2 or 3, provided that when b is 1, each $R^2$ may be the same or different and provided that when b is 2 or 3, each X may be the same or different; and a component (C) comprising a polyolefin polymer.

In some embodiments, X in general formulas (1) and (2) is represented by —OR, where R is an alkyl having 1 to 2 carbon atoms. In some embodiments, the organic polymer of components (A and/or B) may have a main chain of polyoxypropylene.

In some embodiments, the organic polymer of components (A and/or B) may include a group represented by the following general formula (3):

$$-NR^3C(=O)- \qquad (3)$$

wherein $R^3$ represents a hydrogen atom, an alkyl group having 1 to 20 carbon atoms, an aryl group having 6 to 20 carbon atoms, or an aralkyl group having 7 to 20 carbon atoms.

In some embodiments, the polyolefin polymer of component (C) may be a chlorinated polyolefin polymer.

In some embodiments, the polyolefin polymer of component (C) may be a polymer modified with acrylic acid moieties, maleic acid, and/or maleic anhydride.

In some embodiments, component (C) may include a solvent or a plasticizer.

DETAILED DESCRIPTION

An object of the present invention is to provide a moisture curable adhesive composition that provides excellent adhesiveness to any surface, including adhesion-resistant surfaces, such as including EPDM, PVC, and TPO, without the use of primers on either smooth-back and fleece-back variants of these substrates. Exemplary EPDM substrates can include Carlisle Sure-Seal® EPDM, Carlisle Sure-White® EPDM, Johns Manville EPDM NR/R, Firestone RubberGard™ EPDM, Firestone Ecowhite™ EPDM, and/or Firestone Fullforce™ EPDM. Exemplary PVC substrates can include GAF EverGuard® PVC, GAF EverGuard® PVC XK, Carlisle Sure-Flex® PVC, Carlisle Sure-Flex® KEE HP, Johns Manville PVC SD Plus, Johns Manville PVC with KEE, and/or Sika Sarnafil PVC. Exemplary TPO substrates can include Firestone UltraPly™ TPO, Firestone UltraPly™ TPO XR, Firestone UltraPly™ TPO Flex Adhered, Firestone Platinum TPO, GAF EverGuard® TPO, GAF EverGuard Extreme® TPO, GAF EverGuard® TPO Ultra, and/or Carlisle Sure-Weld TPO.

A moisture curable composition includes a component (A) comprising an organic polymer containing reactive silicon groups represented by the following general formula (1):

$$-Si(R^1{}_{3-a})X_a \qquad (1)$$

wherein $R^1$ represents an alkyl group having 1 to 20 carbon atoms, an aryl group having 6 to 20 carbon atoms, or an aralkyl group having 7 to 20 carbon atoms, X represents a hydrolyzable group, and a an integer from 1 to 3, provided that when a is 1 each $R^1$ may be the same or different, and provided that when a is 2 or 3, each X may be the same or different.

In some embodiments, X represents —OR, wherein R is an alkyl group having 1 to 2 carbon atoms.

In some embodiments, the organic polymer of component (A) has a viscosity greater than 20,000 cP at 23° C.

The curable composition comprises a component (B) having an organic polymer, having a viscosity lower than 10,000 cP at 23° C., containing reactive silicon groups represented by general formula (2):

$$-Si(R^2{}_{3-b})X_b \qquad (2)$$

wherein $R^2$ represents an alkyl group having 1 to 20 carbon atoms, an aryl group having 6 to 20 carbon atoms, or an aralkyl group having 7 to 20 carbon atoms, X represents a hydrolyzable group, and b is an integer from 1 to 3, provided that when b is 1 each $R^2$ may be the same or different and when b is 2 or 3, each X may be the same or different.

In some embodiments, X represents —OR, wherein R is an alkyl group having 1 to 2 carbon atoms.

In some embodiments, the organic polymer of component (B) has a viscosity lower than 5,000 cP at 23° C.

The curable composition comprises a component (C) having a polyolefin polymer.

When X in general formula (1) and general formula (2) is a hydrolyzable group, X is not particularly limited as long as X is a known hydrolyzable group. Specific examples thereof include hydrogen and halogen atoms; and alkoxy, acyloxy, ketoximate, amino, amide, acid amide, aminooxy, mercapto, and alkenyloxy groups. Out of these, alkoxy groups such as methoxy, ethoxy, propoxy and isopropoxy groups are in particular preferred, since the hydrolyzability thereof is mild, allowing the compound to be easily handled.

$R^1$ in general formula (1) and $R^2$ in general formula (2) are not particularly limited and either may be an alkyl group having 1 to 20 carbon atoms, an aryl group having 6 to 20 carbon atoms, or an aralkyl group having 7 to 20 carbon atoms. Specific examples thereof include alkyl groups such as methyl, ethyl, propyl and isopropyl groups, aryl groups such as a phenyl group, and aralkyl groups such as a benzyl group. Out of these groups, a methyl group is particularly preferred from the viewpoint of the availability of the starting material.

A specific structure of the reactive silicon group represented by general formula (1) or general formula (2) is not particularly limited as long as the structure is known. Particularly preferred are trimethoxysilyl, methyldimethoxysilyl, triethoxysilyl, and methyldiethoxysilyl groups from the viewpoint of the reactivity and the availability thereof.

One species, or two or more species of reactive silicon group may be used in combination in each of chemical formulas (1) and (2).

The introduction of the reactive silicon group into a polyoxyalkylene polymer main chain of component (A and/or B) is performed by a known method. Examples thereof include the following methods:

(i) A polyoxyalkylene polymer having a functional group such as a hydroxy group is caused to react with an organic compound having an active group exhibiting reactivity with the functional group and having an unsaturated group, thereby yielding a polyoxyalkylene polymer having the unsaturated group. Alternatively, for example, when an epoxide is subjected to ring-opening polymerization to yield a polyoxyalkylene polymer, an unsaturated group-containing epoxide is ring-opening-copolymerized therewith to yield an unsaturated group-containing polyoxyalkylene polymer. In such a way, a monomer having an unsaturated group unrelated to any polymerization reaction is copolymerized, thereby yielding an unsaturated group-containing organic polymer. Next, a hydrosilane having a reactive silicon group is caused to react onto the resultant reaction production, thereby the reaction product is hydrosilylated.

In order to introduce the reactive silicon group at a high introduction ratio in the method (i), it is preferred to add a hydrosilane compound to an organic polymer containing an unsaturated group represented by $CH_2=C(R^4)-CH_2-$ or $CH(R^4)=CH-CH_2-$ wherein $R^4$ represents hydrogen or a hydrocarbon group having 1 to 10 carbon atoms, thereby attaining the introduction. More preferably, $R^4$ is hydrogen or a methyl group. In order to set the introduction ratio of the reactive silicon group to 85% or more, it is particularly important that $R^4$ is a methyl group.

Specific examples of the hydrosilane compound used in the method (i) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximate silanes such as bis(dimethyl ketoximate)methylsilane, and bis(cyclohexyl ketoximate)methylsilane. However, the hydrosilane compound is not limited thereto. Out of these compounds, halogenated silanes and alkoxysilanes are particularly preferred, and alkoxysilanes are most preferred since the hydrolyzability of the composition obtained therefrom is mild so that the composition is easily handled.

(ii) A compound having a mercapto group and a reactive silicon group are caused to react with an unsaturated group-containing polyoxyalkylene polymer obtained in the same manner in the method (i).

The synthesis method (ii) is, for example, a method of introducing a compound having a mercapto group and a reactive silicon group into an unsaturated bond moiety of an organic polymer by radical addition reaction in the presence of a radical initiator and/or a radical generating source. However, the method is not particularly limited. Specific examples of the compound having a mercapto group and a reactive silicon group include, but are not limited to, γ-mercaptopropyltrimethoxysilane, γ-mercaptopropylmethyldimethoxysilane, γ-mercaptopropyltriethoxysilane, and γ-mercaptopropylmethyldiethoxysilane.

(iii) A polyoxyalkylene polymer having a functional group such as a hydroxyl group, an epoxy group, or an isocyanate group is caused to react with a compound having a functional group having reactivity to the former functional group and having a reactive silicon group. The functional groups of the compound are not limited, but isocyanate group or amino group is preferable. Isocyanate group is particularly preferable.

Out of individual choices for the synthesis method (iii), the method for causing a polyoxyalkylene polymer having a hydroxyl group at its terminal to react with a compound having an isocyanate group and a reactive silicon group is, for example, a method described in Japanese Laid-Open Patent Application No. 3-47825. However, the method is not particularly limited. Specific examples of the compound having an isocyanate group and a reactive silicon group include γ-isocyanatopropyl-trimethoxysilane, γ-isocyanatopropyl-methyldimethoxysilane, γ-isocyanatopropyl-triethoxysilane, γ-isocyanatopropyl-methyldiethoxysilane, α-isocyanatomethyl-dimethoxymethylsilane, and α-isocyanatomethyl-trimethoxysilane. However, the compound is not limited thereto.

Out of the above-mentioned methods, method (i) or (iii) is preferred since the polymer obtained by the method (ii) emits a strong odor based on the mercaptosilane. In connection with the method for introducing the reactive silicon group, the organic polymer obtained by the method (i), which has the reactive silicon group(s), is more preferred than the polymer obtained by the method (iii) since the polymer becomes a composition having a low viscosity and a good workability. On the other hand, the method (iii) is preferred since the introduction of a silyl group into a hydroxyl group-containing polymer can be attained only in one step so that the Component (A) and Component (B) can be produced with a good productivity.

Out of individual choices for the method (iii), preferred is a method of causing a polyoxyalkylene polymer having a hydroxyl group at its terminal to react with a compound having an isocyanate group and a reactive silicon group since a high conversion ratio is obtained in a relatively short reaction time. An oxyalkylene polymer obtained by such a reaction is a polymer having the reactive silicon group(s) and a group represented by the following general formula (3):

$$-NR^3-C(=O)- \qquad (3)$$

wherein $R^3$ represents a hydrogen atom, an alkyl group having 1 to 20 carbon atoms, an aryl group having 6 to 20 carbon atoms, or an aralkyl group having 7 to 20 carbon atoms.

Component (A) having a group represented by the general formula (1) and Component (B) having a group represented by general formula (2) can also be obtained by a method other than the above mentioned methods. Specifically, a compound obtained by a chain elongating reaction of a polyol with a diisocyanate compound, for example, an aromatic polyisocyanate, such as toluene(tolylene)diisocyanate, diphenylmethanediisocyanate or xylylenediisocyanate, or an aliphatic polyisocyanate, such as isophoronediisocyanate or hexamethylenediisocyanate, is a compound having a group of the general formula (3) regardless of the method for introducing the reactive silicon group.

Component (A) may be linear or branched, and the number-average molecular weight thereof is preferably 3,000 or more, and is realistically 100,000 or less in terms of polystyrene based on gel permeation chromatography (GPC). The number-average molecular weight is more preferably between 10,000 or more and 50,000 or less. The molecular weight is measured with the use of HLC-8120GPC (TOSOH CORPORATION) as a solution-sending system, TSK-GEL H type column (TOSOH CORPORATION), and THF solvent.

Component (B) may be linear or branched, and the number-average molecular weight thereof is preferably 500 or more, and is realistically 15,000 or less in terms of polystyrene based on gel permeation chromatography (GPC). The number-average molecular weight is more preferably between 1,000 or more and 10,000 or less. The molecular weight is measured with the use of HLC-8120GPC (TOSOH CORPORATION) as a solution-sending system, TSK-GEL H type column (TOSOH CORPORATION), and THF solvent.

The reactive silicon group of Component (A) and Component (B) may be bonded to a terminal end of the polyoxyalkylene polymer or along the polymer chain between the terminal ends thereof, or a plurality of the reactive silicon groups may be bonded to both of a terminal end thereof and along the polymer chain between the terminal ends thereof. In particular, when the reactive silicon group is bonded only to the terminal end, the network of the polymer component contained in the composition is effectively constructed. Thus, this case is preferred since a rubbery cured product high in strength and elongation is easily obtained.

As the method for measuring the introduction ratio of the reactive silicon groups in Component (A) and Component (B), various methods can be used. The ratio can be calculated from the integral value of the terminals to which the reactive silicon groups are introduced on the basis of the 1H-NMR spectrum thereof. The introduction ratio of the reactive silicon groups is a numerical value obtained by representing, in percentage, the value obtained by dividing the number of the reactive silicon groups present in the molecule by the number of the terminals of the molecule. Specifically, in the case of a linear polymer (that is, a polymer having two terminal ends), having in a single polymer chain thereof two reactive silicon groups on average an introduction ratio of 100% is calculated out. For this reason, with a polymer wherein many reactive silicon groups are present at moieties other than terminal ends of the polymer chain, the calculated value of the introduction ratio may be over 100%. In the present invention, a linear polymer having reactive silicon groups only at both terminal ends can be preferably used. Usually a polymer of introduction ratio of less than 85% is used. A linear polyoxyalkylene polymer having reactive silicon groups only at both terminal ends thereof can be prepared as follows:

(a) Hydroxyl groups that are present only at the terminal ends of a linear polyoxyalkylene polymer is converted to —OM groups (wherein M is Na or K). The resulting polymer is reacted with an organic halogen compound represented by the formula $CH_2=C(R^4)-CH_2-Z$ (wherein $R^4$ is the same as defined above and Z is a halogen atom) to obtain polyoxyalkylene polymer having an unsaturated group(s) only at its terminal ends. A hydrosilane compound represented by the formula $H-Si(R^1_{3-a})X_a$ (wherein $R^1$, X, and a are the same as defined above) is added to react with a polyoxyalkylene polymer having an unsaturated group(s) only at its terminal ends to obtain a linear polyoxyalkylene polymer with reactive silicon groups only at its terminal ends.

(b) A linear polyoxyalkylene polymer having hydroxyl groups only at the terminal ends thereof is reacted with a compound having isocyanate group and a group represented by the formula $-Si(R^1_{3-a})X_a$ (wherein $R^1$, X, and a are the same as defined above) to obtain a linear polyoxyalkylene polymer with reactive silicon groups only at its terminal ends.

The number of the reactive silicon groups in a single polymer chain of the Component (A) is preferably 1 or more on average, and is preferably from 1.1 to 5.

The number of the reactive silicon groups in a single polymer chain of the Component (B) is preferably 0.5 or more on average, and is preferably from 0.8 to 3.

Specific examples of the polyoxyalkylene polymer of Component (A), which has reactive silicon group(s), are suggested in Japanese Publication of examined patent application (Kokoku) No. 45-36319, Japanese Publication of examined patent application (Kokoku) No. 46-12154, Japanese Laid-Open Patent Application No. 50-156599, Japanese Laid-Open Patent Application No. 54-6096, Japanese Laid-Open Patent Application No. 55-13767, Japanese Laid-Open Patent Application No. 55-13468, Japanese Laid-Open Patent Application No. 57-164123, Japanese Publication of examined patent application (Kokoku) No. 3-2450, U.S. Pat. Nos. 3,632,557, 4,345,053, 4,366,307 and 4,960,844, and others. Other examples thereof are polyoxyalkylene polymers suggested in Japanese Laid-Open Patent Application No. 61-197631, Japanese Laid-Open Patent Application No. 61-215622, Japanese Laid-Open Patent Application No. 61-215623 and Japanese Laid-Open Patent Application No. 61-218632. The polyoxyalkylene polymers are polymers having a number-average molecular weight of 6,000 or more and a molecular weight distribution (Mw/Mn) of 1.6 or less and having reactive silicon group(s), which have a high molecular weight and a narrow molecular weight distribution. However, the Component (A) is not particularly limited thereto.

The above-mentioned polyoxyalkylene polymers, which each have reactive silicon group(s), may be used alone or in combination of two or more thereof.

The polyolefin polymer of Component (C) used in the present invention is not particularly limited, and may be known in the art. Specific examples thereof include polyolefin homopolymers, such as ethylene, propylene and butylene, and copolymers thereof; ethylene-propylene-diene based rubber (EPDM) and modified products thereof; chlorinated polyolefins such as chlorinated polyethylene and chlorinated polypropylene, copolymers thereof, and the chlorinated polyolefins modified with acrylic acid moieties, maleic acid and/or maleic anhydride; copolymers made from an olefin and a carboxylic acid monomer, such as ethylene-acrylic acid copolymer, and isobutylene-maleic anhydride copolymer. The polyolefin polymer may be dispersed in a solvent or a plasticizer. Specific examples of polyolefin polymers dispersed in solvent or plasticizer include but are not limited to AdvaBond® 8203, AdvaBond® 8232, AdvaBond® 8214, and combinations thereof.

A moisture curable adhesive composition in accordance with this invention includes 1 to 100% by weight, and preferably 10 to 70% by weight of Component (A) based on the total weight of the adhesive compositions; 1 to 100% by weight, and preferably 1 to 50% by weight of Component (B) based on the total weight of the adhesive compositions, and 0.1 to 20% by weight, and preferably 0.5 to 10% by weight of Component (C) based on the total weight of the adhesive compositions. Surprisingly, these compositions are capable of achieving universal good adhesion across different substrates, including EPDM, PVC and TPO even without using primer. These compositions may be formulated free of or contain a low amount of volatile organic compounds (VOCs), which do not present a significant environmental burden, health risk or fire hazard. The components used for the adhesive compositions are free flowing liquids at room temperature, allowing easy processing during the adhesive manufacturing process.

In some embodiments, the moisture curable adhesive composition includes the component (A) comprising an organic polymer containing reactive silicon groups. The organic polymers of component (A) are commercially available and/or can be prepared in accordance with techniques known in the art. Examples of these polymers containing reactive silicon groups include but are not limited to silyl-terminated polyether and silane-terminated polyurethane. More specific examples of commercially available polymers containing reactive silicon groups for component (A) include but are not limited to KANEKA MS POLYMER® S327, KANEKA MS POLYMER® S227, KANEKA SILYL® SAX220, and combinations thereof.

In some embodiments, the moisture curable adhesive composition includes a component (B) having an organic polymer containing reactive silicon groups with viscosity lower than 10,000 cP at 23° C., and in some embodiments, lower than 5,000 cP at 23° C. Examples of low viscosity commercially available polymer containing reactive silicon groups include but are not limited to KANEKA SILYL® SAT145, KANEKA SILYL® SAT115, and combinations thereof.

The moisture curable adhesive composition of the present invention may optionally contain various other additives such as fillers, adhesion promoters, dehydration agents, plasticizers, anti-sagging agents (thixotropic agents), stabilizers, and curing catalysts.

In some embodiments, the moisture curable adhesive composition may contain various fillers. Examples of the fillers include reinforcing fillers such as fumed silica, precipitated silica, crystalline silica, and carbon black; fillers such as heavy calcium carbonate, colloidal calcium carbonate, magnesium carbonate, diatomite, calcined clay, clay, talc, titanium oxide, and bentonite; and fibrous fillers such as glass fibers and filaments.

In some embodiments, the moisture curable adhesive composition may include a dehydration agent to improve the storage stability. A dehydration agent may be, but need not be, limited to an alkoxysilane compound such as n-propyl trimethoxysilane, octyltrimethoxysilane, or vinyltrimethoxysilane.

In some embodiments, the moisture curable adhesive composition includes adhesion promoters. The adhesion promoter may be selected from a silane coupling agent, a reaction product of a silane coupling agent, or a compound other than silane coupling agents. Specific examples of the silane coupling agent include but are not limited to isocyanate group containing silanes; amino group containing silanes, mercapto group containing silanes; epoxy group containing silanes; vinylically unsaturated group containing silanes; and halogen containing silanes. Other silane coupling agents include derivatives obtained by modifying the foregoing compounds, such as amino modified silyl polymers, unsaturated aminosilane complexes, phenylamino long chain alkyl silanes, aminosilylated silicones, and silylated polyesters.

In some embodiments, the moisture curable adhesive composition includes a curing/condensation catalyst. A condensation catalyst is added to the curable composition of the present invention in order to promote the hydrolysis and condensation of the reactive silyl group of the reactive silicon group containing organic polymer to cause cross-linking. Examples of the curing catalyst include but are not limited to titanium compounds such as tetrabutyl titanate, tetrapropyl titanate, and titanium tetraacetylacetonate; quadrivalent tin compounds such as dibutyltin dilaurate, dibutyltin maleate, dibutyltin phthalate, dibutyltin dioctate, dibutyltin diethylhexanolate, dibutyltin dimethylmaleate, dibutyltin diethylmaleate, dibutyltin dibutylmaleate, dibutyl tin dioctylmaleate, dibutyltin ditridecylmaleate, dibutyltin dibenzylmaleate, dibutyltin diacetate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, and a reaction product of dibutyltin oxide and a phthalic acid ester; bivalent tin compounds such as tin octylate, tin naphthenate, and tin stearate; organic aluminum compounds such as aluminum trisacetylacetonate, aluminum trisethylacetoacetate, and diisopropoxyaluminum ethylacetoacetate; zirconium compounds such as zirconium tetraacetylacetonate; amine compounds such as aliphatic primary amines, aliphatic secondary amines, aliphatic tertiary amines, and aliphatic unsaturated amines; nitrogen-containing heterocyclic compounds such as pyridine, imidazole, and 1,8-diazabicyclo(5,4,0) undecene-7 (DBU); guanidines such as guanidine, phenylguanidine, and diphenylguanidine; and biguanides such as butylbiguanide, 1-o-tolylbiguanide, and 1-phenyl biguanide; and other known silanol condensation catalysts such as carboxylic acid metal salts, acidic catalysts and basic catalysts. These catalysts may be used alone or in combination of two or more thereof.

In some embodiments, the moisture curable adhesive composition may include an antioxidant. The antioxidant is preferably a hindered phenolic antioxidant. Examples of the hindered phenolic antioxidant include but are not limited to Irganox® 245, Irganox® 1010, and Irganox® 1076, available from BASF, and combinations thereof.

In some embodiments, the moisture curable adhesive composition may include a light stabilizer. The light stabilizer can prevent photo-oxidative degradation of the cured product. Examples of the light stabilizer include but are not limited to benzotriazole compounds, hindered amine compounds, and benzoate compounds.

In some embodiments, the adhesive composition may include an ultraviolet absorber. The ultraviolet absorber can increase the surface weather resistance of the cured product. Examples of the ultraviolet absorber include but are not limited to benzophenone compounds, benzotriazole compounds, salicylate compounds, substituted tolyl compounds, and metal chelate compounds.

In some embodiments, the moisture curable adhesive composition may include thixotropic agent. Specific examples of thixotropic agent include but are not limited to hydrogenated castor oil, organic amide wax, organic bentonite, and calcium stearate. These thixotropic agents may be used alone or in combination of two or more thereof.

In some embodiments, the moisture curable adhesive composition may include plasticizer to control the viscosity. Specific examples of plasticizers include but are not limited to phthalate compounds such as dibutyl phthalate, diisononyl phthalate, di(2-ethylhexyl) phthalate, and diisodecyl phthalate; non-phthalate compounds such as 1, 2-cyclohexane dicarboxylic acid diisononyl ester; aliphatic polycarboxylate compounds; unsaturated fatty acid ester compounds, alkyl sulfonic acid phenyl esters, hydrocarbon oils and polymeric plasticizer such as polyether polyols. These plasticizers may be used alone or in combination of two or more thereof.

Various other additives may optionally be added to the moisture curable adhesive composition of the present invention in order to control the properties of the curable composition or cured product. Examples of such additives include flame retardants, curability modifiers, lubricants, pigments, and antifungal agents. These additives may be used alone or in combinations of two or more.

The curable composition of the invention will be described on the basis of the following examples; however, the invention is not limited to these examples.

Synthesis of Polymer 1

400 gram of polypropylene glycol (molecular weight 8000 g/mol) was charged into a glass reactor equipped with stirrer. The polypropylene glycol was heated to 60° C. 5.86 gram of isophorone diisocyanate was added dropwise to the reactor, followed by 0.16 gram of tin catalyst (Fomrez SUL-4, dibutyltin dilaurate). The solution was stirred at 95° C. for 2 hours. Then 9.13 gram of 3-(Trimethoxysilyl)propyl isocyanate was added to the reactor. The solution was stirred at 95° C. for another 5 hours to yield a polyoxypropylene polymer with trimethoxysilyl end groups.

The various blended components used in the examples and comparative examples herein are listed as follows:

Component (A): Kaneka MS Polymer® 5327 and 5227, which are polyoxypropylene polymers containing a methyldimethoxysilyl group(s), available from Kaneka Corp., and Polymer 1.

Component (B): Kaneka SILYL® Polymer SAT145, which is a polyoxypropylene polymer containing a methyldimethoxysilyl group(s), available from Kaneka Corp.

Component (C): AdvaBond® 8203, which is a chlorinated polypropylene resin solution in xylene, and AdvaBond® 8232, which is a solvent free chlorinated polyolefin adhesion promoter, both available from Advanced Polymer, Inc.

Other additives included SYLVATAC RE25, which is a rosin ester tackifier, available from Kraton Corporation; Hubercarb® G2T, which is a surface-treated calcium carbonate, available from Huber Engineered Materials of Atlanta, Georgia, USA; Hubercarb® G8, which is a calcium carbonate, available from Huber Engineered Materials; Irganox® 245, which is a sterically-hindered phenolic antioxidant, available from BASF; VTMO, which is a vinyltrimethoxysilane dehydration agent, available from Evonik Industries; DAMO-T, which is a N-(2-Aminoethyl)-3-aminopropyltrimethoxysilane adhesion promoter, available from Evonik Industries; APS-P35, which is a silane/siloxane alkoxy oligomer adhesion promoter, available from Advanced Polymer, Inc.; Dyhard OTB, which is 1-(o-Tolyl) biguanide, available from AlzChem Group; and Neostann U220H, which is dibutyltin diacetylacetonate, available from Nitto Kasei Co., Ltd.

Comparative Examples 1 to 4 and Inventive Examples 1 to 6

All components were weighed according to the formulations shown in Table 1, and then mixed and kneaded by a mixer under dehydration conditions with substantially no water. Thereafter the mixture was packed into moisture-proof containers (polyethylene cartridge). The curable compositions of Examples 1 to 6 and Comparative Examples 1 to 4 were produced in this way. The properties of the resultant curable compositions were measured as follows:

Viscosity: A RV type Brookfield viscometer was used to measure the viscosity of each composition (Spindle: No. 7, rotation speed 2 and 10 rpm, temperature: 23° C.).

Skin Formation Time: After applying each of the compositions on a substrate, and the surface of the composition was flattened. The time point at which the surface was flattened was defined as the start time. The surface of the composition was touched by the spatula, and the time period required for the mixture to no longer stick to the spatula was determined at conditions of 23° C. and 50% relative humidity ("R.H.").

Peel strength: the adhesion strength was determined by T-peel test. The specimens with size 1.0 inch×6.0 inch were cut from EPDM single-ply roof membrane. Each of the compositions was applied on the EPDM specimen to form a uniform layer, then another EPDM specimen was pressed on top of the adhesive layer. Three testing specimens were prepared for each formulation. The test specimens were allowed to cure at 23° C. and 50% R.H. for 28 days. After 28 days curing, the adhesion strength was measured using Shimadzu tensile tester Model AGS-20KNXD with peeling rate 2 inch/min in accordance with ASTM D 1876, and average peel strength was recorded. Same method was used to measure adhesion strength on PVC or TPO roof membrane substrates.

T-peel test specimens preparation when using primer: AdvaBond® 8203 was used as primer in some Examples for TPO substrates: The primer solution was prepared by diluting the AdvaBond® 8203 down to 5% solids using xylene. The 5% solids solution was applied on the TPO substrate and dried in fume hood for at least 30 min. Each of the adhesive compositions was then applied on top of primer to form a uniform layer, then another primer coated TPO specimen was pressed on top of the adhesive layer. The resultant was allowed to cure at 23° C. and 50%. R.H. for 28 days. After 28 days curing, the adhesion strength was measured using the tensile tester with peeling rate 2 inch/min in accordance with ASTM D 1876, and average peel strength was recorded.

As shown in the examples set forth below, inclusion of a tackifier leads to an adhesive composition which has limitation during the manufacture process. As is known to those of skill in the art, a tackifier is very viscous and tacky material at room temperature. The tackifier must be heated and melted before it can be incorporated into an adhesive formulation during the compounding process. This may led to a longer process time. Although the resulting adhesive product may provide adequate adhesion on some substrates, the process to produce adhesives containing tackifier as a component is not favourable. See, for example, Comparative example 1, which included a tackifier.

In contrast, the adhesive compositions of the present invention include reactive silicon groups containing a polymer having a low viscosity, i.e. a viscosity less than 10,000 cP at 23° C., or more preferably, a viscosity of less than 5,000 cP at 23° C. These polymers were easily incorporated into the adhesive formulations during the compounding process. Moreover, the resulted adhesive compositions also have lower viscosity due to introduction of low viscosity polymers to the formulations, and the resulting products will be easy to apply during the application process. See, for example, Comparative examples 1 and 2 vs. Example 1.

Inclusion of different adhesion promoters to the adhesive composition significantly impact the adhesion strength. Herein, T-peel strength was measured to check the adhesion performance T-peel strength lower than 4 pounds per linear inch ("pli") is considered poor. T-peel strength of between 4-5 pli is considered adequate. T-peel strength of between 5-6 pli is considered good, and T-peel strength higher than 6 pli is considered as excellent. For example, it was found that an adhesive composition that included only aminosilane based adhesion promoters showed limited adhesion on all tested substrates with T-peel strength lower than 4 pli (see, for example, Comparative example 3). As a comparison, an adhesive composition that included an additional oligomer silane based adhesion promoter (such as, APS-P35) to the adhesion promoter component provided good adhesion with T-peel strength higher than 5 pli on EPDM and PVC substrates without the use of a primer, but a primer was still required to provide adequate adhesion on TPO (See, for example, Comparative example 4). It was surprisingly found that an adhesive composition that includes a modified polyolefin adhesion promoter (AdvaBond® 8203 or AdvaBond® 8232) provides good adhesion on EPDM, PVC and TPO, even without a primer (Example 1-5).

By incorporating a selection of suitable polymers containing reactive silicon groups having high flexibility, the cured materials showed high residual tackiness, which also helps improve the adhesion performance.

In addition to EPDM, PVC and TPO, the adhesive formulations of the present invention, see e.g. Examples 1 and 4, also showed good adhesion profile to other difficult-to-adhere-to plastic substrates, like polypropylene and resin-based coatings, such as Kynar's polyvinylidene fluoride coating.

TABLE 1

Adhesive Formulations of Comparative Examples

|  |  | Comparative Example 1 | Comparative Example 2 | Comparative Example 3 | Comparative Example 4 |
|---|---|---|---|---|---|
| Component A | S327 |  |  | 30.9 | 30.2 |
|  | S227 | 44.6 | 49.0 |  |  |
| Component B | SAT145 |  |  | 20.6 | 20.1 |
| Component C (Adhesion promoter) | AdvaBond® 8203 | 3.6 | 3.9 |  |  |
| Tackifier | SYLVATAC RE25 | 8.9 |  |  |  |
| Calcium Carbonate | G2T | 10.7 | 11.8 | 12.4 | 12.1 |
|  | Q3T | 25.0 | 27.5 | 28.9 | 28.1 |
| Anti-oxidant | Irganox® 245 | 0.9 | 1.0 |  | 1.0 |
| Dehydration agent | VTMO | 1.3 | 1.5 | 1.5 | 1.5 |
| Adhesion promoter | DAMO-T | 1.3 | 1.5 | 1.5 | 1.5 |
|  | APS-P35 |  |  |  | 1.5 |
| Curing catalyst | Dyhard OTB | 2.2 | 2.5 | 2.6 | 2.5 |
|  | U-220H | 1.3 | 1.5 | 1.5 | 1.5 |
| Total |  | 100 | 100 | 100 | 100 |

TABLE 2

Adhesive Formulations of Inventive Examples

|  |  | Example 1 | Example 2 | Example 3 | Example 4 | Example 5 | Example 6 |
|---|---|---|---|---|---|---|---|
| Component A | S327 | 29.4 | 29.9 | 28.8 | 29.4 |  |  |
|  | S227 |  |  |  |  | 39.2 |  |
|  | Polymer 1 |  |  |  |  |  | 29.8 |
| Component B | SAT145 | 19.6 | 19.9 | 19.2 | 19.6 | 9.8 | 19.8 |
| Component C (Adhesion promoter) | AdvaBond® 8203 | 3.9 | 2.5 | 5.8 |  |  | 4.0 |
|  | AdvaBond® 8232 |  |  |  | 3.9 | 3.9 |  |
| Calcium Carbonate | G2T | 11.8 | 11.9 | 11.5 | 11.8 | 11.8 | 11.9 |
|  | Q3T | 27.5 | 27.9 | 26.9 | 27.5 | 27.5 | 27.8 |
| Anti-oxidant | Irganox® 245 | 1.0 | 1.0 | 1.0 | 1.0 | 1.0 | 1.0 |
| Dehydration agent | VTMO | 1.5 | 1.5 | 1.4 | 1.5 | 1.5 | 1.5 |
| Adhesion promoter | DAMO-T | 1.5 | 1.5 | 1.4 | 1.5 | 1.5 | 1.5 |
|  | APS-P35 |  |  |  |  |  |  |
| Curing catalyst | Dyhard OTB | 2.5 | 2.5 | 2.4 | 2.5 | 2.5 | 2.5 |
|  | U-220H | 1.5 | 1.5 | 1.4 | 1.5 | 1.5 | 0.3 |
| Total |  | 100 | 100 | 100 | 100 | 100 | 100 |

As is shown in Tables 3 and 4, Examples 1 to 6 led to universal good adhesion across a series of adhesion-resistant substrates. The substrates used in the Examples and Comparative Examples were all smooth-backed substrates. This was noticeably better than the Comparative Examples 1 to 4.

TABLE 3

Typical Adhesion Properties of Comparative Examples

|  |  |  | Comparative Example 1 | Comparative Example 2 | Comparative Example 3 | Comparative Example 4 |
|---|---|---|---|---|---|---|
| Viscosity | 2 rpm | cp | 92,000 | 86,000 | N/A | 49,500 |
|  | 10 rpm | cp | 82,000 | 71,000 |  | 37,350 |
| Skin formation time | | min. | 94 | 58 |  | 106 |
| T-peel (pli) | | | | | | |
| EPDM white | | | 1.5 | 3.2 | 1.3 | 8 |
| EPDM black | | | 5.6 | 5 | N/A | 8.3 |
| PVC | | | 20.1 | 24 | 3.5 | 9.2 |
| TPO | | | 1.6 | 2.6 | N/A | <2 |
| TPO with primer | | | N/A | N/A | N/A | 4.4 |

TABLE 4

Typical Adhesion Properties of Inventive Examples

|  |  |  | Example 1 | Example 2 | Example 3 | Example 4 | Example 5 | Example 6 |
|---|---|---|---|---|---|---|---|---|
| Viscosity | 2 rpm | cp | 49,750 | 60,000 | 47,550 | 51,000 | 84,350 | 52,500 |
|  | 10 rpm | cp | 39,450 | 51,950 | 35,950 | 37,900 | 65,450 | 45,400 |
| Skin formation time | | min. | 60 | 51 | 62 | 70 | 66 | 20 |
| T-peel (pli) | | | | | | | | |
| EPDM white | | | 6.8 | 5.4 | 6.8 | 7.2 | 7.8 | 1.6 |
| EPDM black | | | 9.3 | 9.1 | 10.1 | 9.7 | 7.4 | 3.6 |
| PVC | | | 8.9 | 7 | 10 | 6.4 | 7.2 | 4.7 |
| TPO | | | 9.7 | 8.7 | 8.9 | 5.6 | 4.6 | 4.1 |
| TPO with primer | | | 4.1 | 5.3 | 5.2 | N/A | N/A | N/A |

To summarize, the present disclosure curable composition comprising a component (A) having an organic polymer containing reactive silicon groups represented by the following general formula (1): —Si(R$^1_{3-a}$)X$_a$ (1) wherein R$^1$ represents an alkyl group having 1 to 20 carbon atoms, an aryl group having 6 to 20 carbon atoms, or an aralkyl group having 7 to 20 carbon atoms, wherein X represents a hydrolyzable group, wherein each X is same or different when two or more X are present, a is an integer from 1 to 3, when a is 1, each R may be the same or different, and when a is 2 or 3, each X may be the same or different; a component (B) having an organic polymer containing reactive silicon groups, wherein the organic polymer having a viscosity lower than 10,000 cP at 23° C., and wherein the reactive silicon groups represented by the following general formula (2): —Si(R$^2_{3-b}$)X$_b$ (2) wherein R$^2$ represents an alkyl group having 1 to 20 carbon atoms, an aryl group having 6 to 20 carbon atoms, or an aralkyl group having 7 to 20 carbon atoms, wherein X represents a hydroxyl group or a hydrolyzable group, wherein each X is the same or different when two or more X are present, b is an integer from 1 to 3, when b is 1, each R$^2$ may be the same or different, and when b is 2 or 3, each X may be the same or different; and a component (C) having a polyolefin polymer; and/or the organic polymer of component (B) has a viscosity lower than 5,000 cP at 23° C.; and/or the organic polymer of component (A) having a viscosity greater than 20,000 cP at 23° C.; and/or the organic polymer of component (A) comprises a main chain of polyoxypropylene; and/or the organic polymer of component (B) comprises a main chain of polyoxypropylene; and/or the organic polymer of component (A) comprises a group represented by the following general formula (3): —NR3C(=O)— (3) wherein R3 represents a hydrogen atom, an alkyl group having 1 to 20 carbon atoms, an aryl group having 6 to 20 carbon atoms, or an aralkyl group having 7 to 20 carbon atoms; and/or the organic polymer of component (B) comprises a group represented by the following general formula (4): —NR4C(=O)— (4) wherein R4 represents a hydrogen atom, an alkyl group having 1 to 20 carbon atoms, an aryl group having 6 to 20 carbon atoms, or an aralkyl group having 7 to 20 carbon atoms; and/or component (C) comprises chlorinated polyolefin polymer; and/or component (C) comprises a polymer modified with acrylic acid moieties, maleic acid, and/or maleic anhydride; and/or component (C) is a solvent or a plasticizer to disperse the polyolefin polymer; and/or the curable composition of claim 1 comprises an additive; and/or the additive is selected from the group consisting of a filler, an adhesion promoter, a dehydration agent, a plasticizer, an anti-sagging agent, a stabilizer, a curing catalyst, and combinations thereof.

Also described herein is a method of applying the above-described curable composition, comprising applying a curable composition to a substrate; and/or the substrate is selected from the group consisting of polyvinyl chloride (PVC), ethylene propylene diene rubber (EPDM), thermoplastic polyolefin (TPO); and/or the substrate is a smooth-back substrate; and/or the method further comprises applying a primer to the substrate prior to application of the curable composition.

Also described herein is a composition comprising a substrate, and the above-described curable composition; and/or the substrate is selected from the group consisting of polyvinyl chloride (PVC), ethylene propylene diene rubber (EPDM), thermoplastic polyolefin (TPO); and/or the substrate is a smooth-back substrate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A curable composition, comprising:
a polymer blend consisting of:
a component (A) having an organic polymer containing reactive silicon groups represented by the following general formula (1):

$$-Si(R^1_{3-a})X_a \quad (1)$$

wherein $R^1$ represents an alkyl group having 1 to 20 carbon atoms, an aryl group having 6 to 20 carbon atoms, or an aralkyl group having 7 to 20 carbon atoms,
wherein X represents a hydrolyzable group, wherein each X is the same or different when two or more X are present,
a is an integer from 1 to 3,
when a is 1, each $R^1$ may be the same or different, and when a is 2 or 3, each X may be the same or different;
a component (B) having an organic polymer containing reactive silicon groups, wherein the organic polymer having a viscosity lower than 10,000 cP at 23° C., and wherein the reactive silicon groups represented by the following general formula (2):

$$-Si(R^2_{3-b})X_b \quad (2)$$

wherein $R^2$ represents an alkyl group having 1 to 20 carbon atoms, an aryl group having 6 to 20 carbon atoms, or an aralkyl group having 7 to 20 carbon atoms,
wherein X represents a hydroxyl group or a hydrolyzable group, wherein each X is the same or different when two or more X are present
b is an integer from 1 to 3,
when b is 1, each $R^2$ may be the same or different, and when b is 2 or 3, each X may be the same or different; and
a component (C) having a polyolefin polymer.

2. The curable composition of claim 1, wherein the organic polymer of component (B) has a viscosity lower than 5,000 cP at 23° C.

3. The curable composition of claim 1, wherein the organic polymer of component (A) has a viscosity greater than 20,000 cP at 23° C.

4. The curable composition of claim 1, wherein the organic polymer of component (A) comprises a main chain of polyoxypropylene.

5. The curable composition of claim 1, wherein the organic polymer of component (B) comprises a main chain of polyoxypropylene.

6. The curable composition of claim 1, wherein the organic polymer of component (A) comprises a group represented by the following general formula (3):

$$-NR^3C(=O)- \quad (3)$$

wherein $R^3$ represents a hydrogen atom, an alkyl group having 1 to 20 carbon atoms, an aryl group having 6 to 20 carbon atoms, or an aralkyl group having 7 to 20 carbon atoms.

7. The curable composition of claim 1, wherein the organic polymer of component (B) comprises a group represented by the following general formula (4):

$$-NR^4C(=O)- \quad (4)$$

wherein $R^4$ represents a hydrogen atom, an alkyl group having 1 to 20 carbon atoms, an aryl group having 6 to 20 carbon atoms, or an aralkyl group having 7 to 20 carbon atoms.

8. The curable composition of claim 1, wherein component (C) comprises chlorinated polyolefin polymer.

9. The curable composition of claim 1, wherein component (C) comprises a polymer modified with acrylic acid moieties, maleic acid, and/or maleic anhydride.

10. The curable composition of claim 1, wherein component (C) comprises a solvent or a plasticizer to disperse the polyolefin polymer.

11. The curable composition of claim 1, further comprising:
an additive.

12. The curable composition of claim 11, wherein the additive is selected from the group consisting of a filler, an adhesion promoter, a dehydration agent, a plasticizer, an anti-sagging agent, a stabilizer, a curing catalyst, and combinations thereof.

13. A method of applying a curable composition, comprising:
applying the curable composition of claim 1 to a substrate.

14. The method of claim 13, wherein the substrate is selected from the group consisting of polyvinyl chloride (PVC), ethylene propylene diene rubber (EPDM), and thermoplastic polyolefin (TPO).

15. The method of claim 14, wherein the substrate is a smooth-back substrate.

16. The method of claim 13, further comprising:
applying a primer to the substrate prior to application of the curable composition.

17. A composition, comprising:
a substrate; and
the curable composition of claim 1.

18. The composition of claim 17, wherein the substrate is selected from the group consisting of polyvinyl chloride (PVC), ethylene propylene diene rubber (EPDM), and thermoplastic polyolefin (TPO).

19. The composition of claim 18, wherein the substrate is a smooth-back substrate.

20. A curable composition, consisting of:
a component (A) having an organic polymer containing reactive silicon groups represented by the following general formula (1):

$$-Si(R^1_{3-a})X_a \quad (1)$$

wherein $R^1$ represents an alkyl group having 1 to 20 carbon atoms, an aryl group having 6 to 20 carbon atoms, or an aralkyl group having 7 to 20 carbon atoms, wherein X represents a hydrolyzable group, wherein each X is the same or different when two or more X are present, a is an integer from 1 to 3, when a is 1, each $R^1$ may be the same or different, and when a is 2 or 3, each X may be the same or different;

a component (B) having an organic polymer containing reactive silicon groups, wherein the organic polymer having a viscosity lower than 10,000 cP at 23° C., and wherein the reactive silicon groups represented by the following general formula (2):

$$-Si(R^2_{3-b})X_b \qquad (2)$$

wherein $R^2$ represents an alkyl group having 1 to 20 carbon atoms, an aryl group having 6 to 20 carbon atoms, or an aralkyl group having 7 to 20 carbon atoms, wherein X represents a hydroxyl group or a hydrolyzable group, wherein each X is the same or different when two or more X are present b is an integer from 1 to 3, when b is 1, each $R^2$ may be the same or different, and when b is 2 or 3, each X may be the same or different;

a component (C) having a polyolefin polymer; and an additive selected from the group consisting of a filler, a dehydration agent, a plasticizer, an anti-sagging agent, a stabilizer, a curing catalyst, and combinations thereof.

* * * * *